US012217728B2

(12) United States Patent
Freeman

(10) Patent No.: US 12,217,728 B2
(45) Date of Patent: Feb. 4, 2025

(54) GUITAR NECK POSITIONING ADJUSTMENT SYSTEM AND METHOD

(71) Applicant: Jeff Freeman, Jamul, CA (US)

(72) Inventor: Jeff Freeman, Jamul, CA (US)

( * ) Notice: Subject to any disclaimer, the term of this patent is extended or adjusted under 35 U.S.C. 154(b) by 229 days.

(21) Appl. No.: 18/078,000

(22) Filed: Dec. 8, 2022

(65) Prior Publication Data

US 2023/0178053 A1 Jun. 8, 2023

Related U.S. Application Data

(60) Provisional application No. 63/287,463, filed on Dec. 8, 2021.

(51) Int. Cl.

| | |
|---|---|
| ***G10D 1/00*** | (2020.01) |
| ***G10D 1/08*** | (2006.01) |
| ***G10D 3/06*** | (2020.01) |

(52) U.S. Cl.

CPC ............... *G10D 1/085* (2013.01); *G10D 3/06* (2013.01)

(58) Field of Classification Search

CPC ............ G10D 3/06; G10D 3/095; G10D 3/22; G10H 1/32

See application file for complete search history.

(56) References Cited

U.S. PATENT DOCUMENTS

2016/0027415 A1* 1/2016 Hooker .................... G10D 1/08 84/293

* cited by examiner

*Primary Examiner* — Kimberly R Lockett
(74) *Attorney, Agent, or Firm* — Donn K. Harms

(57) ABSTRACT

An insert is provided for insertion in a space between a guitar neck and a guitar body to provide for adjustment of the geometric characteristics of the assembled guitar. The insert is configured to allow insertion of the insert body into the space without dismounting the guitar neck from the body. Using scanning of the guitar neck and guitar body mounting points, an exterior surface configuration of the insert can be calculated to yield the desired geometric characteristics.

14 Claims, 8 Drawing Sheets

GUITAR NECK POSITIONING ADJUSTMENT SYSTEM AND METHOD

This application claims priority to U.S. Provisional Patent Ser. No. 63/287,463, filed on Dec. 8, 2021, which is incorporated herein in its entirety by this reference thereto.

BACKGROUND OF THE INVENTION

1. Field of the Invention

The present invention relates generally to guitars. More particularly, it relates to a device and system providing a method for aligning a guitar neck in a desired positioning relative to a guitar body to which it attaches.

2. Prior Art

Electric guitars have been the instrument of choice for a large number of guitar players for decades. Such modern electric guitars are conventionally manufactured from various wood types. In this process, an electric guitar body may be formed of one type of wood or several, depending on how the body is constructed. The neck, which must be attached to the guitar body, may be formed of another type of wood. Still further, the fret board, which is positioned on the neck, may be formed of yet another type of wood.

Because wood is not a completely stable material, it is affected by relative humidity, the water content of the respective wood employed, and by other factors. The multiple wood types in combination with the various environmental factors thereon, combine to render wood a challenge to work with in the manufacture of electric guitars. However, in the world of music, it is a given fact that wood remains the choice of musicians as the finest material for guitars.

To that end, manufacturers are continually challenged in their task of combining all of the various wood components into a functional guitar assembly. They are further challenged by having to engage other critical parts, such as the frets, bridge, tuning pegs and the nut while maintaining the playability of the instrument.

In this guitar configuration process, a neck joint of the guitar (electric or acoustic guitar or bass) provides the attachment point of the guitar neck to the body. This is accomplished by using a neck pocket formed in the guitar body which becomes the critical joint to determine the alignment of the neck pitch angle to the body.

This alignment of the neck to the face of the guitar body is critical to the playability of the guitar. There will always be variation in the pitch angle and other geometries of the neck position due to the presence of variation in the manufacturing process. Given that the head stock of the guitar projects some distance forward from the neck pocket attach point the variation at the head stock can be significant. At some point this variation becomes so significant that the guitar cannot be brought into a playable setup. Even after proper manufacturing a working guitar can become misaligned due to many factors. This is where rework of the geometry of the neck engagement with the guitar body is required.

With regard to the neck joint configuration, there are a number of ways that such guitars are configured so as to connect the guitar neck to the guitar body for such instruments. Conventionally, the "bolt on" mode has become highly popular with guitar manufacturers.

This "bolt-on" method is most frequently employed in the manufacture and assembly of solid body electric guitars and on acoustic flattop guitars. In the typical bolt on mode of assembly, such as with an electric guitar, the body of the guitar and the neck engaged to it are in a cross in horizontal plane.

The neck, conventionally, has a mounting end or first end which is inserted in a pre-routed recess or pocket formed into a front surface of the guitar body. Once so inserted, the mounting end of the neck and the body are engaged using connectors such as screws. There can be significant pressure exerted by the four screws as they tighten in their connection with the neck, and to avoid damage, conventionally, a rectangular metal plate is used to secure the joint and redistribute the screw pressure more evenly. The mounting end of the neck is conventionally planar on at least the side surface which contacts against the guitar body within the pocket, and more often is formed in a rectangular shape.

However, over years of use by guitar players, the positioning of the neck relative to the guitar body to which it engages can change and render the guitar unplayable or hard to play. This can be caused by the neck changing dimensions over time due to playing and humidity and other factors or by the guitar player's handling of the guitar. In some cases, electric guitars can leave the factory with less than desired angled positioning of the neck relative to the guitar body, which can cause playability issues, such as causing improper or undesired spring spacing from the fret surface of the neck.

Once the guitar neck has become positioned in a manner rendering the guitar hard or impossible to play, or should it be manufactured in such a manner, the guitar must be taken to a skilled repair facility or person to reconfigure it to a desired positioning of the neck for the guitar player. However, neck repositioning and repairs are, conventionally, more of an art than a science, and consequently, accurate neck positioning, to that desired by an owner, can be a challenge, at best, when working with repair professionals.

The forgoing examples of related art in the field of guitars and neck alignment therefor, and limitation related therewith, are intended to be illustrative and not exclusive, and they do not imply any limitations on the alignment system and method described and claimed herein. Various limitations of the related art will become apparent to those skilled in the art upon a reading and understanding of the specification below and the accompanying drawings.

SUMMARY OF THE INVENTION

The device herein disclosed and described provides a highly accurate and easy to employ device and system for accurate and repeatable positioning of guitar necks, to desired engagement positioning to a guitar body.

The system herein employs a slidably engageable shim or insert which, in all preferred modes, is engageable between the mounting end of a guitar neck and the guitar body, without fully removing the guitar neck. Each shim or insert is configured with slots formed therein which are positioned to slide upon and past the connectors, such as screws, which hold the mounting end of the guitar neck to the body of the guitar.

Thus, in the simplest mode of the invention herein, a user having one or a kit of inserts which have varied angular and/or thickness configurations, can choose an insert to position in a sandwiched engagement in a space between the mounting end of the guitar neck and the guitar body, which achieves the desired positioning of the neck, relative to the strings and front surface of the guitar. While primarily shown with a neck surface having frets, the disclosed device and system herein will also work with fretless guitars. Conventionally, the first end of the neck has at least one planar surface which faces and contacts against a planar surface of the pocket formed in the body where connectors hold the surface of the neck compressed against the planar surface of the guitar body.

Where string action is the primary concern for the dimensional characteristics of the inserts, on fretted guitars, the adjustment will be for the distance of the bottom of the string to the top surface of the physical fret. On fretless instruments, it would be dimensioned for the desired spacing from the bottom of the strings to the facing surface of the neck. The inserts can be configured with parallel sides, for simple spacing, or angled and parallel sides such that once inserted and the neck tightened, the neck is positioned at the angle and distance from the strings the user desires.

In this simple mode of the system, the inserts can be provided in kits thereof having the varying parallel and angled side surfaces which will allow them to be inserted between the neck and body of the guitar to achieve the final result of neck angle and string action desired by the user. This simple mode of the device and system enables the supplied inserts in the kit to act as gauges as well as a final insert which is positioned in the joint of the guitar neck in the proper desired angular engagement with the guitar body.

This mode of the device and system would work well for actual guitar users with minimal repair skills as well as small repair shops. This is because it provides numerous thicknesses and angled configurations of the insert device, all of which are insertable to both the test position and the eventual mounted position, without full removal of the guitar neck.

With the provided slotted configuration, where the slots align with the mounting screws holding the neck to the body, the system herein provides an easy way to discern that the neck is positioned correctly, or in a custom fashion for the user, by simply tightening the mounting screws with a chosen insert in place and viewing and measuring the string positions relative to the front surface of the neck once tightened. In one preferred mode, configured for positioning of the slots along the path of the mounting screws such as for a Fender guitar, slots are configured to accommodate screws which are positioned two inches apart from front to back and one and one-half inches side to side.

As such, for guitars with this spacing, the slots are formed to communicate through the body of the device with a center axis thereof which are substantially 1.5 inches apart, which position open ends of the slots on a first end of the insert body, having centers with the same spacing. This configuration and spacing of the two slots will allow the body of the insert device to slide into the pocket formed on the body while the screws holding the neck are loose but engaged through it to the guitar body. The two slots extend from the open ends at the first end of the body toward the tab portion of the body a distance far enough where the slots are covered by the neck and body, once inserted. With the body of the device so inserted, preferably, a tab portion of the body of the insert device will initially extend from the edge of the guitar body which intersects with the exterior side of the formed pocket.

This body configuration of the device allows the user to loosen the screws or bolts holding the neck to the body and to insert any of a plurality of device bodies having differing thicknesses, angles, and other configurations. So inserted, the user may tighten the screws and examine the positioning of the neck to determine if a desired positioning is achieved. If not achieved, the positioning of the neck relative to the guitar body with the inserted device can be used to determine which other body of the plurality to insert to achieve the desired geometry or configuration of the guitar neck to the guitar body. This insertion and removal action may be employed by the user until the desired geometry of the projecting neck from the attachment thereof to the guitar body is achieved.

For example and in no way limiting, inserts with a thinner body and parallel side surfaces will produce larger gaps between the strings and the neck surface or any frets thereon. Inserts which are thicker and having parallel opposing surfaces will cause a raising of the neck relative to the body and produce smaller gaps between the strings and the neck surface or any frets thereon. The inserts, currently, have been found to work best where they are provided with a thickness of the body between 0.1 mm to 2.5 mm.

Additionally, inserts having angled opposing side surfaces can be used to adjust or straighten the angle of the neck, the fretless surface, or the frets thereon relative to the guitar body and extending strings to adjust string gaps for the desire of the user. Angled thicknesses of the inserts can be employed to change the angle of the neck surface, relative to the adjacent strings, to change the action or amount of string depression a user needs at different ends of the neck. By slightly changing the angle of the surface of the neck, relative to the strings extending between the bridge on the body and the distal end of the neck, different string actions and the like are achievable.

The insert devices herein, where provided as a kit of differently dimensioned inserts, can bear indicia thereon indicating the configuration of the identified insert. The indicia can not only provide the thickness of the insert between the front and rear surfaces it can designate angles and other aspects. Currently, as noted, where provided in kits or a 3D printable body, the thickness of the body can be in increments from 0.1 mm to 2.5 mm although other thicknesses may be employed where necessary to achieve the geometric configuration of the neck to the guitar body.

In another mode, the inserts can be of a color that is cross referenced to a particular dimensioning for thickness and angle, etc. For example, an insert of one color may be planar on both sides, and an insert of a second, different color, may have a planar first side and angled second side.

In another mode of colored identification, each of the inserts in the kit may be formed from colored materials that are translucent. Each insert is a different color and when multiple inserts are stacked, the color of each one results in a combined result. This makes it easy to determine the final remedial insert required. For example and in no way limiting, one blue insert placed against a yellow insert would result in a green color combination which would yield the exterior dimensions needed for the final remedial insert.

The kit, having a plurality of inserts, may include basic configurations to remediate often occurring problems with guitars such as necks extending at angles causing string contact or high string distance from frets. The kit may also include other configurations such as angled opposing surfaces on the body of the insert to correct a rotated neck or in some case to provide one if the user seeks such. Finally, the kit may allow the user to order a specialty dimensioned inserts from the system provider herein, which can be sent electronically to be 3D printed, or sent by post for employment later.

In another mode of the system herein, the insert body can be manufactured using 3D printing to form a resulting insert with the slots aligned for a sliding engagement with the connectors or screws of the guitar being worked upon and of proper length. In this fashion, virtually any customized configuration may be achieved for the engaged neck with the guitar body. This mode of the system will allow the user to take measurements, either manually and/or by using surface scanning devices, and they may ascertain appropriate measurements and distances of various areas of the guitar body and neck.

As an example of the 3D printing mode of the system a desired configuration as to angles, slots and thickness and the like may be determined onsite and then printed. To that end, the user will discern a desired neck mount configuration having the desired string positioning relative to the fret surface of the neck, and/or desired angle of the neck relative to the guitar body, and/or fret positioning around the axis of the neck, or other considerations which the guitar player wishes to have in the finished guitar.

Next, the guitar, with the neck engaged as it exists, will be measured either with measuring instruments and the like, and/or by using surface scanners which will communicate digital signals to a computing device, which software running in electronic memory on the computer may employ to produce 3D digital renditions of the guitar body, neck, mounting end of the neck, guitar face, and mounting pocket or slot for the guitar neck.

Next, using dimension calculating software configured to the task of discerning 3D measurements from the digital images of the scanned surfaces, the software will calculate a digital image of the assembled guitar in its current configuration.

Using this digital imagery of the current configuration of the guitar, insert-discerning software will calculate the three dimensional configuration of a remedial shim or insert which will reconfigure the current configuration of the guitar, to the desired finished guitar configuration, noted above.

In another step, three dimensional printing software running on the computer and/or a 3D printer, using the discerned three-dimensional configuration of the required remedial insert, will cause the printer to print a 3D insert with the dimensional characteristics of the determined remedial insert. This can be formed of plastic or polymeric material using conventional 3D printers.

Once printed, the remedial insert, preferably having the appropriate slot or slots in positions aligned with connectors engaging the neck to the body of the guitar, can be slid between the neck and the body at the connection point therebetween. Once the connectors are operatively tightened, the guitar being worked upon will have changed configurations from the current configuration when it was measured and/or scanned, to the desired finished guitar configuration originally determined. A testing by the user for playability can follow and if the guitar with the remedial insert mounted yields the desired guitar configuration decided earlier, and if that yields a guitar configuration for the user, then the guitar can be tendered to the user as finished.

However, should other changes as to string positioning, neck positioning or such be needed, that changed dimension can be provided to the insert discerning software, as a subsequent reconfiguration of a remedial insert which will provide the change in the configuration desired.

Thereafter, the second remedial insert is 3D printed or machined, or otherwise formed to the size and angular dimensions required to yield the changed configuration can be inserted between the mounting end of the neck and the contact surface of a pocket or recess formed in the body which engages with the neck, Once the screws holding the neck are tightened, the angle of the neck to the body and distance of the strings from the fret surfaces will be at the desired configured guitar configuration.

In all modes of the disclosed device, as those skilled in the art can discern, the system herein provides for the configuring of a guitar setup geometry either during original manufacture or a remedial re-configuration. The assembled guitar represents a set of geometries which can be adjusted to the player desired setup using the adjustments designed into the device and system herein. For example and in no way limiting, such can include a positive neck pitch angle where the neck angle is pitched up from the neck pocket attach point. It can also include a negative neck pitch angle where the neck angle is pitched down from the neck pocket attach point at the guitar body. Further, such can include the adjustment of neck roll angle around the neck axis and neck as well as string height adjustments toward and away from the mounted neck.

With respect to the above description, before explaining at least one preferred embodiment of the herein disclosed guitar alignment system in detail, it is to be understood that the invention is not limited in its application to the details of construction and to the arrangement of the components in the following description or illustrated in the drawings. The guitar alignment apparatus, system, and method, herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based, may readily be utilized as a basis for designing of other guitar neck alignment apparatuses and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, the term "substantially" if not otherwise defined, means plus or minus five percent.

It is an object of this invention to provide a highly accurate guitar neck positioning and alignment system for measuring and subsequent operative positioning of guitar necks in a chosen or determined setup geometry or alignment with the guitar body to which it is engaged.

It is a further object of this invention to provide such an alignment or neck positioning system for guitar necks and guitar bodies, which allows for highly accurate and repeatable positioning of the guitar neck along one or more axis extending from a mount to a guitar body.

It is yet another object of this invention to provide such a device enabling highly accurate guitar neck engagement to guitar bodies which is employable both during original manufacturing of guitars as well as for customized and remedial guitar neck positioning for necks on guitars, which are already in use.

Other objects, features, and advantages of the presently disclosed device and method for guitar neck alignment, as well as the advantages thereof over existing prior art, will become apparent from the description to follow, and are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the disclosed device. It is intended that the embodiments and figures disclosed herein are to be considered illustrative rather than limiting.

Figure 1:
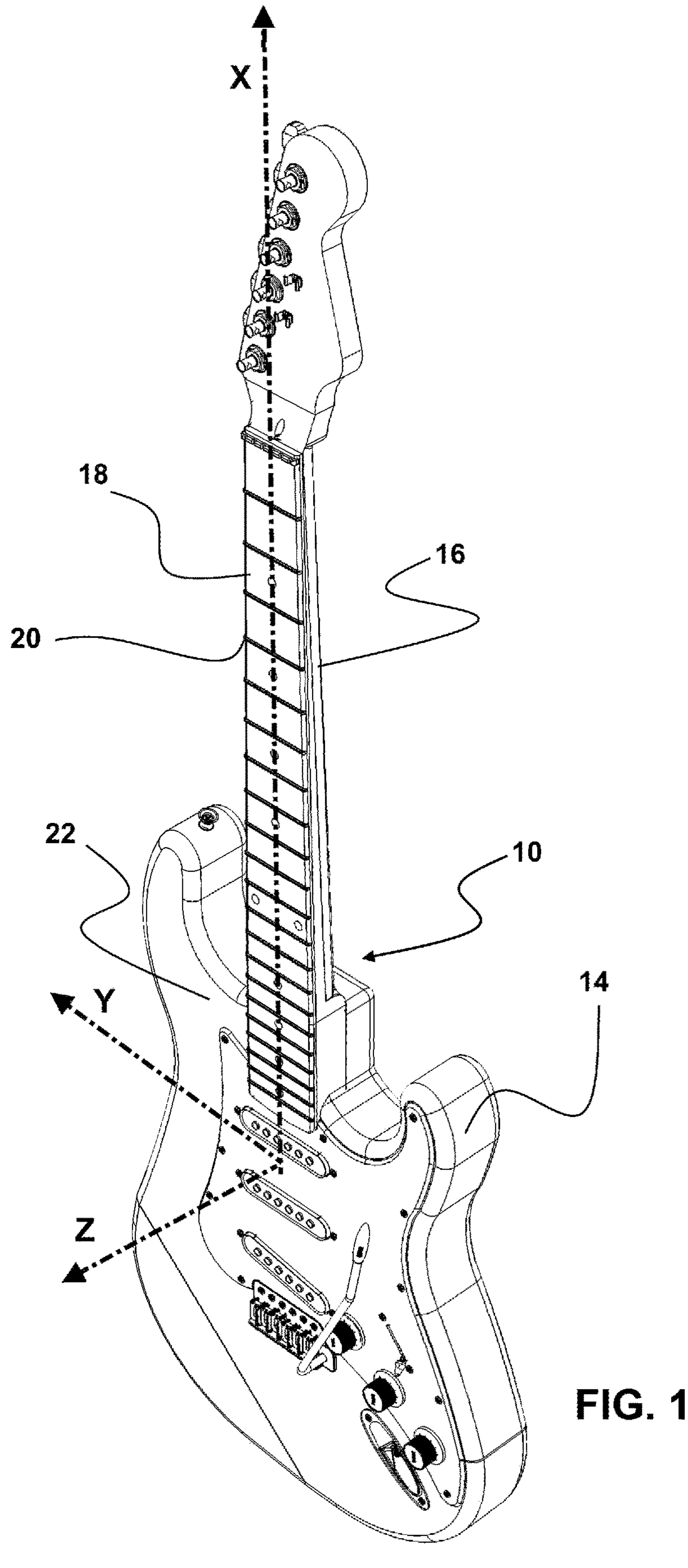
FIG. 1 depicts a conventional electric guitar having a guitar body to which a guitar neck is mounted and shows the X axis of the neck relative to the Y axis of the front surface of the guitar body and a Z axis along which string position above the neck and the angle of the front surface of the neck to the Y axis can be determined.

Other aspects of the presently disclosed spacing device or insert invention for positioning a guitar neck to a desired configuration when mounted to a guitar body shall be more readily understood when considered in conjunction with the accompanying drawings, and the following detailed description, neither of which should be considered limiting.

DETAILED DESCRIPTION OF THE PREFERRED

Embodiments of the Invention

In this description, the directional prepositions of up, upwardly, down, downwardly, front, back, top, upper, bottom, lower, left, right and other such terms refer to the spacers or inserts or guitar components as they are oriented and/or appear in the drawings and are used for convenience only, and they are not intended to be limiting or to imply that the device herein has to be used or positioned in any particular orientation.

Now referring to drawings in FIGS. 1-13, there is seen in FIG. 1 a depiction of a conventional electric guitar. Such widely used electric guitars conventionally have a body 14 portion which is engaged with a neck 16. The device 10 and system, in all modes herein, is adapted with a body 11 which is dimensioned for the easy user configuring of a guitar setup geometry for such assembled electric guitars 12.

Also shown in FIG. 1 is an X axis, which is the angular positioning of the neck 16 relative to the body 14 and can also be considered where the neck 16 is rotated around the X axis to determine an angular position of the neck surface 18 which can be fretless or have conventional frets 20 mounted thereon.

Axis Y, in general, is depicted as the axis through which the plane of the body face 22 runs and can be used in combination with the X axis to determine if the neck surface 18 runs parallel or inline with the body face 22 along the X axis or if the neck 16 is twisted and the neck surface 18 is slanted relative to the body face 22. The Z axis can be employed to determine if the neck surface 18 is aligned with the body face 22 or is running at an angle thereto. The software, noted herein, can employ such axis positioning and measurements to determine a current configuration of a guitar.

Figure 2:
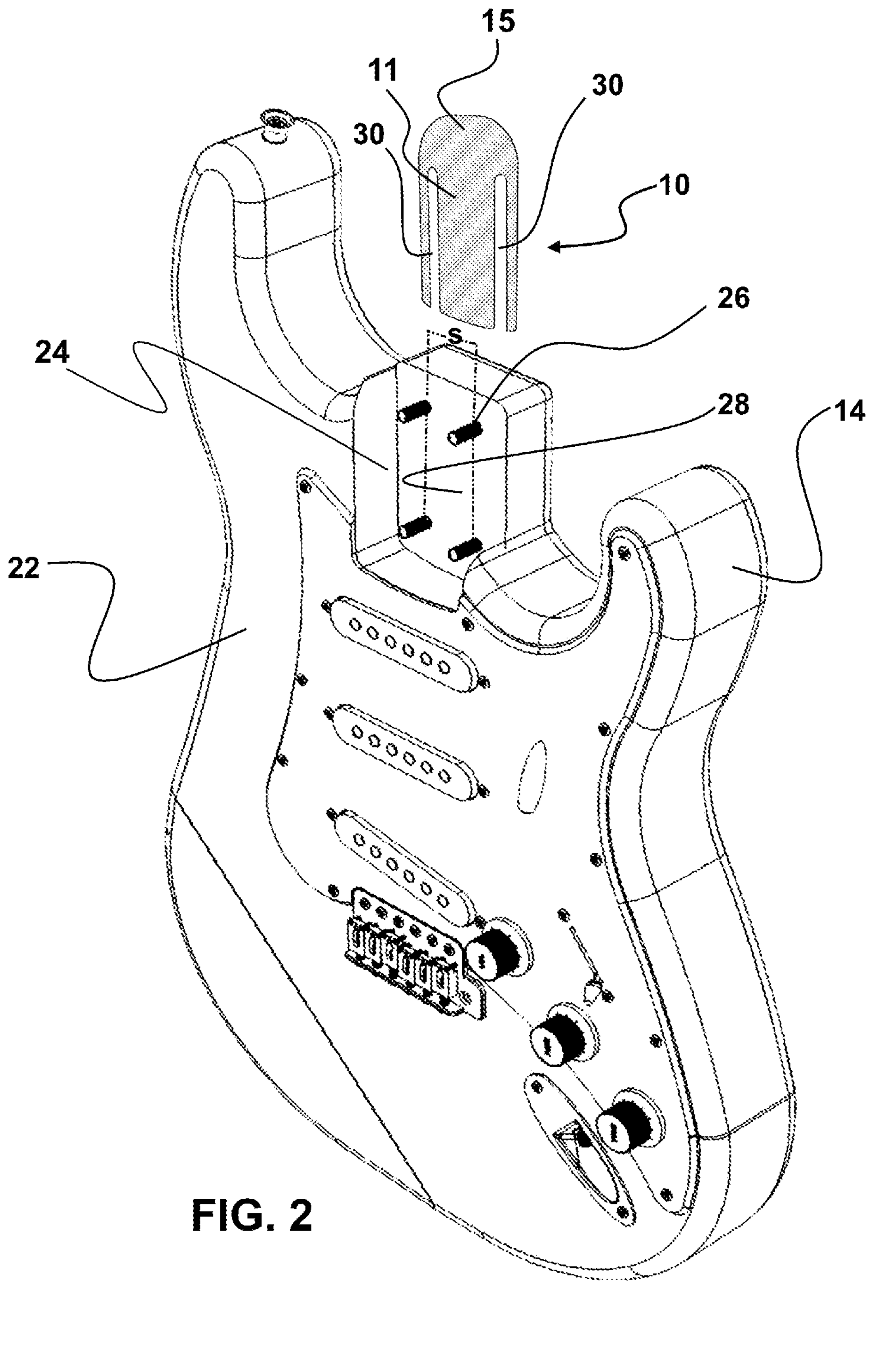
FIG. 2 shows a conventional electric guitar body having a neck mounting recess having mounting connectors extending above a planar mounting surface at the bottom of the recess and shows a spacing device herein with slots positioned to accommodate the connectors, when slid to a sandwiched position between the mounting surface and the guitar neck.

As shown in FIG. 2, the conventional electric guitar body 14, such as in FIG. 1, has a neck mounting recess 24. This recess 24 or pocket, conventionally, has a plurality of mounting connectors 26 extending above a planar mounting surface 28. The mounting connectors 26, conventionally, are inserted through openings in the guitar body 14 from the rear such that they project into the pocket or recess 24 where the mounting end of the guitar neck 16 is positioned. These mounting connectors 26, such as screws or bolts are engaged with the mounting end of the guitar neck 16 by rotating them with the neck 16 positioned in the recess 24 or pocket which is configured with the planar mounting surface 28 which mates with a similarly shaped surface neck mounting surface (not shown but well known) on the mounting end of the guitar neck 16.

Also shown in FIG. 2, the insert device 10 is configured to be positioned in contact against the mounting surface 28 within the neck mount recess 24 in a sandwiched positioning between the mounting surface 28 and the planar mounting end at the engagement end of the guitar neck 16. The neck 16 is shown completely removed for clarity. However, the insert device 10 herein is configured so that the mounting connectors 26 communicating into engagement with the neck 18 need only be slightly loosened to allow insertion of the body 11 of the insert device 10 in the area between the planar mounting surface 28 and the surface of the neck at the engagement end thereof.

One or a plurality of slots 30, communicating through the body of the insert device 10, are positioned to align with the spacing S of the mounting connectors 26 which engage through the guitar body 14 while the neck is loosely engaged with the neck 16. This is most important to thereby allow the body 11 of the insert device 10 to be slid into position in the space 13 (FIG. 3) between the engagement end of the guitar neck 16 and the mounting surface 28 of the guitar body 14. This configuration is highly preferred in all modes of the body 11 of the insert device 10 and system herein. A simple loosening of the connectors 26 to allow the sliding positioning of the body 11 of the insert device 10 allows for this significant increase in ease of use and utility. The user can thus use the body 11 of a respective insert as a gauge to determine if it or another configured body 11 of another insert, will provide the configuration geometry of the neck 16 as mounted to the guitar body they wish.

Figure 3:
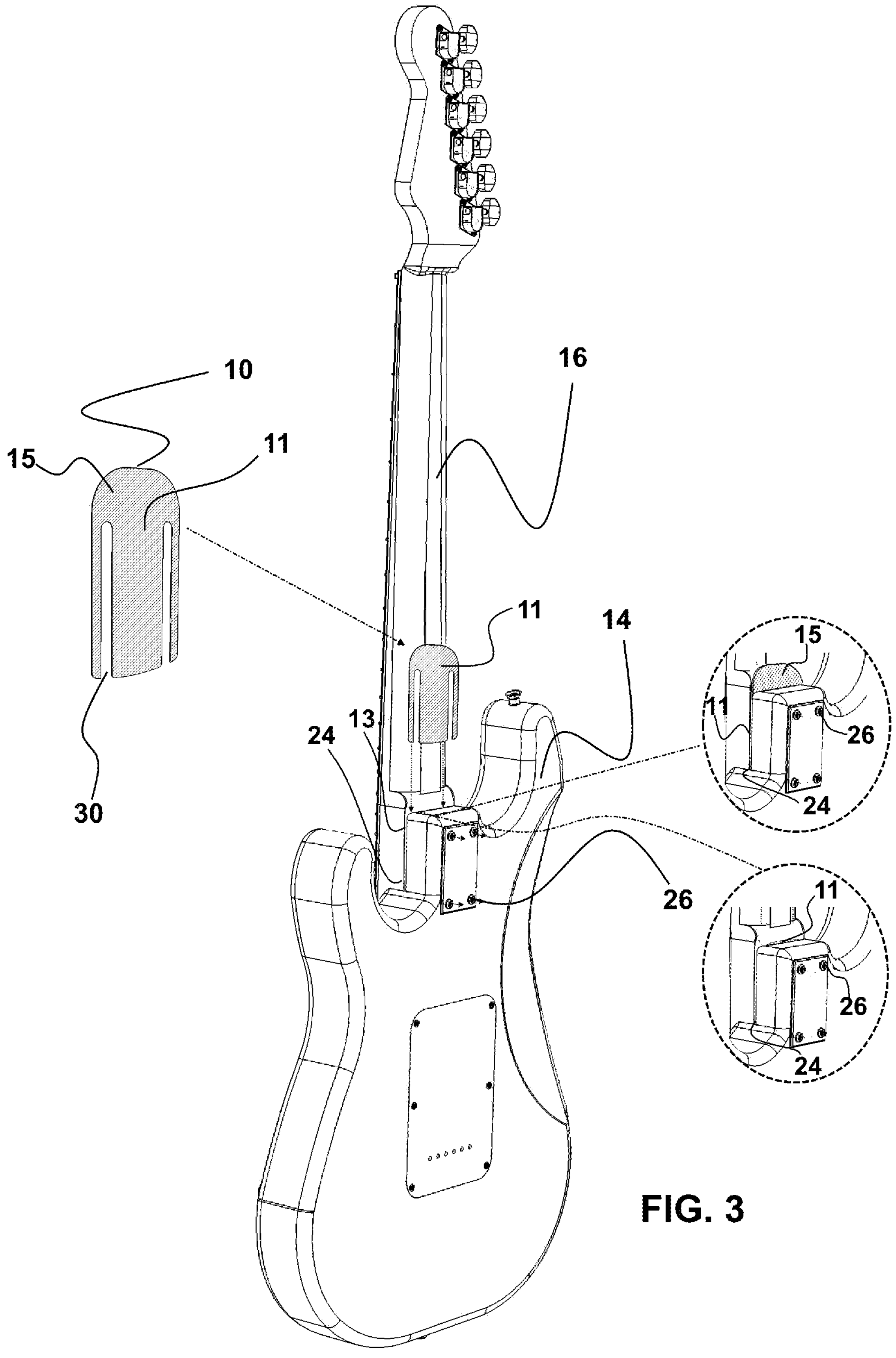
FIG. 3 depicts how the spacing device herein can be slid into the sandwiched position by loosening, but not removing, the guitar neck, because the slots allow for a sliding thereof into position.

The depiction of FIG. 3 shows the ease of positioning the body 11 of the operatively configured insert device 10 into the space 13 between the neck 16 and guitar body 14. As shown, the slots 30 communicate through the body of the insert device 10 and are positioned to align with the connectors 26 which engage through the body 14. The positioning and number of connectors 26 of the guitars from many manufacturers use four connectors, which are aligned, but the horizontal spacing therebetween (S FIG. 2) may vary, and the spacing between the slots 30 and number thereof would vary depending on the guitar they engage. However, in the preferred configuration of the insert devices 10 herein, the slots 30 will be configured for the depicted slide-in mounting by just loosening and not removing the neck 18.

Figure 4:
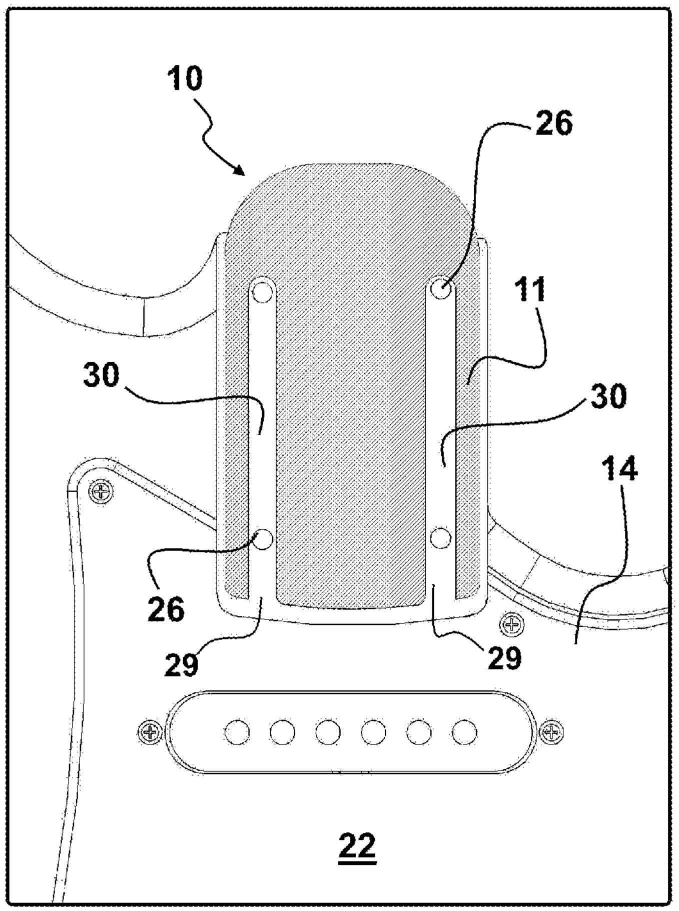
FIG. 4 shows an example of the spacing device herein having operatively spaced and positioned slots formed in the body thereof, allowing for sliding it to the mounted position into a space between the neck and body, without disconnecting the mounting connectors from the engagement end of the neck.

In FIG. 4 is shown a depiction of the guitar body 14, with the neck 16 removed for clarity, to show a final positioning of the body 11 of the insert device 10 herein into a space 13 between the mounting end of the neck 16 and the mounting surface 28. With the insert device 10 and system herein this is, as noted, achievable by simply loosening the connectors 26 in their engagement to the neck 16 without disconnecting them and the neck 16 from the guitar body 22. However, the neck 16 could be removed and the guitar body 14 and the body 11 of the insert positioned, before the neck 16 is re-engaged.

As shown, the body 11 of the insert device 10 may be slid to position with the connectors 26 moving within the slots 30 to which they align. The open ends 29 of each slot 30 are positioned in the body 11 to allow the user to simply slide the body 11 of the insert device 10 over the first mounts 26 and secondary mounts 26 in the aligned mounts 26.

The horizontal spacing of the slots 30 from each other, in all modes of the body 11 of the device 10, is relative to or substantially the same as the horizontal spacing of the connectors 26 shown as “S” in FIG. 2, which communicate through openings in the guitar body 14 and any such spacing is anticipated herein. For example, many guitar manufacturers have four connectors 26 where they are horizontally spaced from each other such as shown as “S” in FIG. 2, in two aligned pairs. This horizontal spacing “S” varies from one inch to two inches with differing manufacturers, with 1.5 inches being a widely employed horizontal spacing by many manufacturers.

As such, the body 11 of the insert herein is operatively configured such that the slots 30, running along substantially parallel axes, are horizontally spaced from each other in substantially the same horizontal spacing “S” as the connectors 26 communicating through the guitar body 14. This is important and preferred to allow them to engage over and along the connectors 26, with the connectors 26 loosened but still connected to the engagement end of a neck 16 and thereby allowing insertion and removal of the body 11 of the insert into the space 13 (FIG. 3).

Figure 4A:
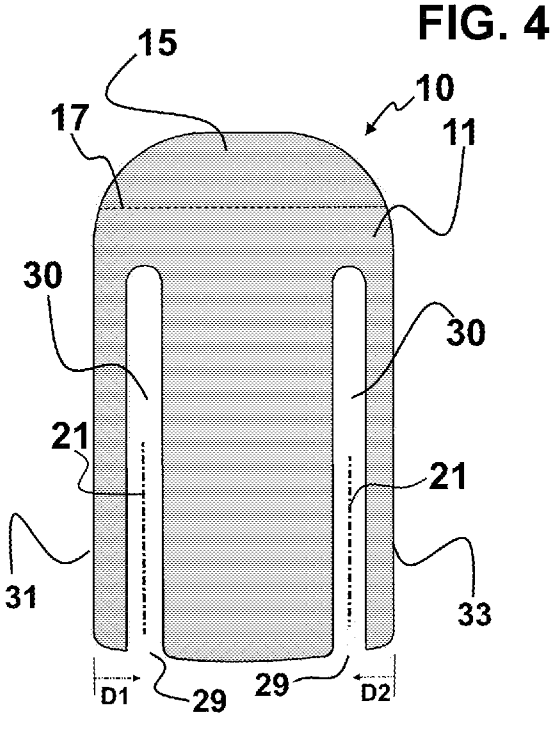
FIG. 4A depicts a mode of the device wherein the positioning of the slots locates one slot further from an adjacent first edge of the body than the second slot adjacent a second edge of the body and showing a frangible tab portion.

FIG. 4A depicts a mode of the body 11 of the device wherein the body 11 has asymmetrical slots 30. By asymmetrical slots 30 is meant that the positioning of the slots 30 locates one slot 30 with a distance D1 of the slot axis 21 which is larger than or further than the distance D2 from an adjacent first edge 31 of the body 11 than the second slot 30 adjacent a second edge 33 of the body 11. Also shown is a frangible tab portion 15 of the body 11. This asymmetrical mode of the body 11 of the device 11 allows the user to flip the body 11 over where connectors 26 of a guitar body 14 may be too close to a sidewall of the recess 24 formed into the guitar body 14. In this mode, the slot axes 21 of the slots 30 will align with the connectors 26 in the preferred fashion. In all modes, the width of each slot 30 is equal to or larger than the diameter of the connectors 26 over which the slot 30 slides.

Figure 4B:
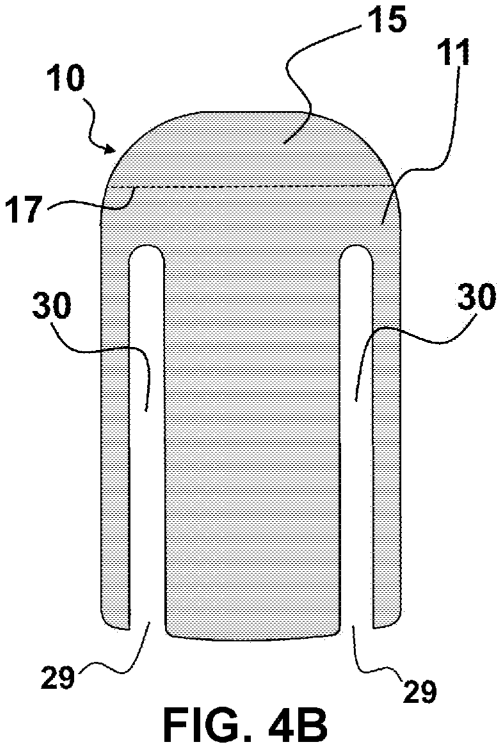
FIG. 4B shows the device having the slots operatively spaced to align with the mounting connectors and are thereby rendered slidable between the over respective mounting connectors while they are loose but still engaged to the neck and showing the tab portion being removable from the body such as by forming a perforation or similar line into the body to allow tearing thereof along a straight line.

Shown in FIG. 4B, the insert device 10 has a body 11 with the slots 30 operatively spaced to align with the mounting connectors 26 to allow for the slide-in positioning in the space 13 while the connectors 26 are loose but still engaged to the neck 16. Also shown in FIG. 4B, as well as 4A, is the tab portion 15 of the body 11 of the insert device 10 which is easily removable from the body 11. Such easy removal is provided by forming a tear line 17 in the body 11, such as a perforation or thin portion of the body 11 along the tear line 17. Such allows for the removal of the tab portion 15, once the user has reached a final configuration of the guitar geometry desired.

This tab portion 15 of the body 11 is positioned to project past the end of the guitar body 14 at the neck engagement end thereof and allows for easy insertion and removal of any body 11 with a tab portion 15. However, once the user has reached a final configuration and tightened the connectors 26 to tightly secure the neck 16 to the guitar body 14, they may wish to remove the tab portion 15, and the tear line 17 provides for an easy disengagement without cutting. However, the device can be formed with a body 11 having a very short tab portion 15 or no tab portion 15 and, while not preferred, the user can still slide differently configured bodies 11, such as from a kit, into the space 13 to achieve the desired guitar geometry.

Figure 5:
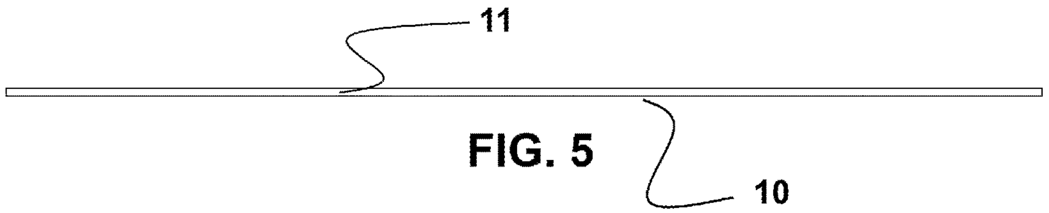
FIGS. 5-10 show sectional views of the spacing device herein having differing thicknesses and angular configurations to allow for correct alignment of the neck, once the chosen spacing device of the determined correct configuration is inserted and the neck tightened to the guitar body.
Figure 6:
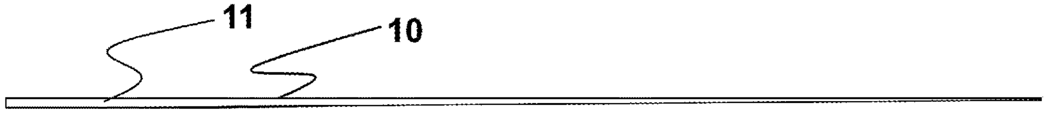
Figure 7:

FIGS. 5-10 depict sectional views through the bodies 11 of differently dimensioned insert devices 10. FIG. 5 shows an insert device 10 having the body 11 with parallel side surfaces which will contact against the mounting end of the neck 16 and the mount surface 26 and simply move the neck surface 18 further above the body face 22. FIGS. 6-7 depict insert devices 10 which are thicker at one end of the body 11 than the other and, once operatively mounted, will change the angle of the neck surface 18 along axis X to tilt it toward or away from axis Z.

Figure 8:
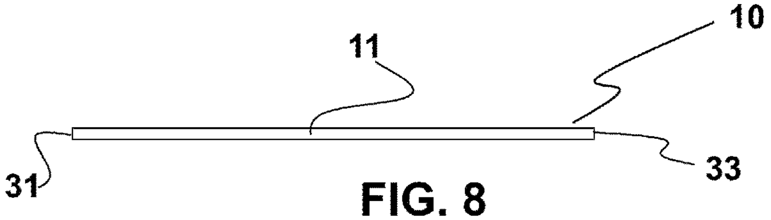

FIG. 8 shows a sectional view of an insert device 10 across the short distance or width thereof, which when operatively inserted, will elevate the neck surface 18 evenly toward the bottom surface of the strings and also elevate it relative to the body face 22.

Figure 9:
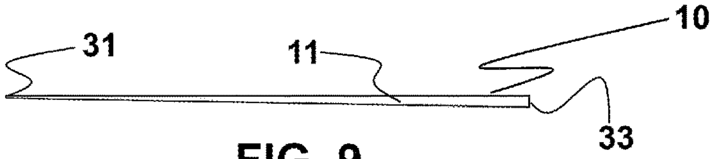
Figure 10:
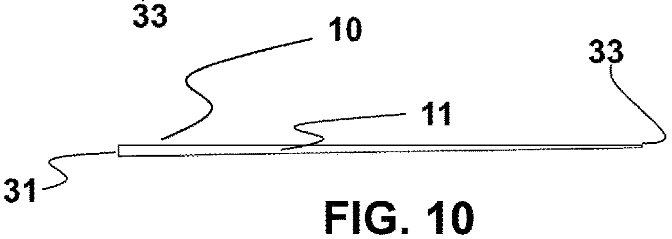

FIGS. 9-10 show examples of insert dimensioning across the short distance or width of the insert device 10, where one side of the body 11 running along the X axis is thicker than the opposite side. This configuration will cause a rotation of the neck surface 18 along the X axis. As can be discerned by those skilled in the art, the examples in FIGS. 5-10 are but a few of the dimensional configurations of the body 11 of insert devices 10 of the system herein, and the number of such configurations to change the positioning of the neck 16 relative to the body 14 of the guitar is infinite and any configuration, as would occur to those skilled in the art, is anticipated within the scope of this application.

Figure 11:
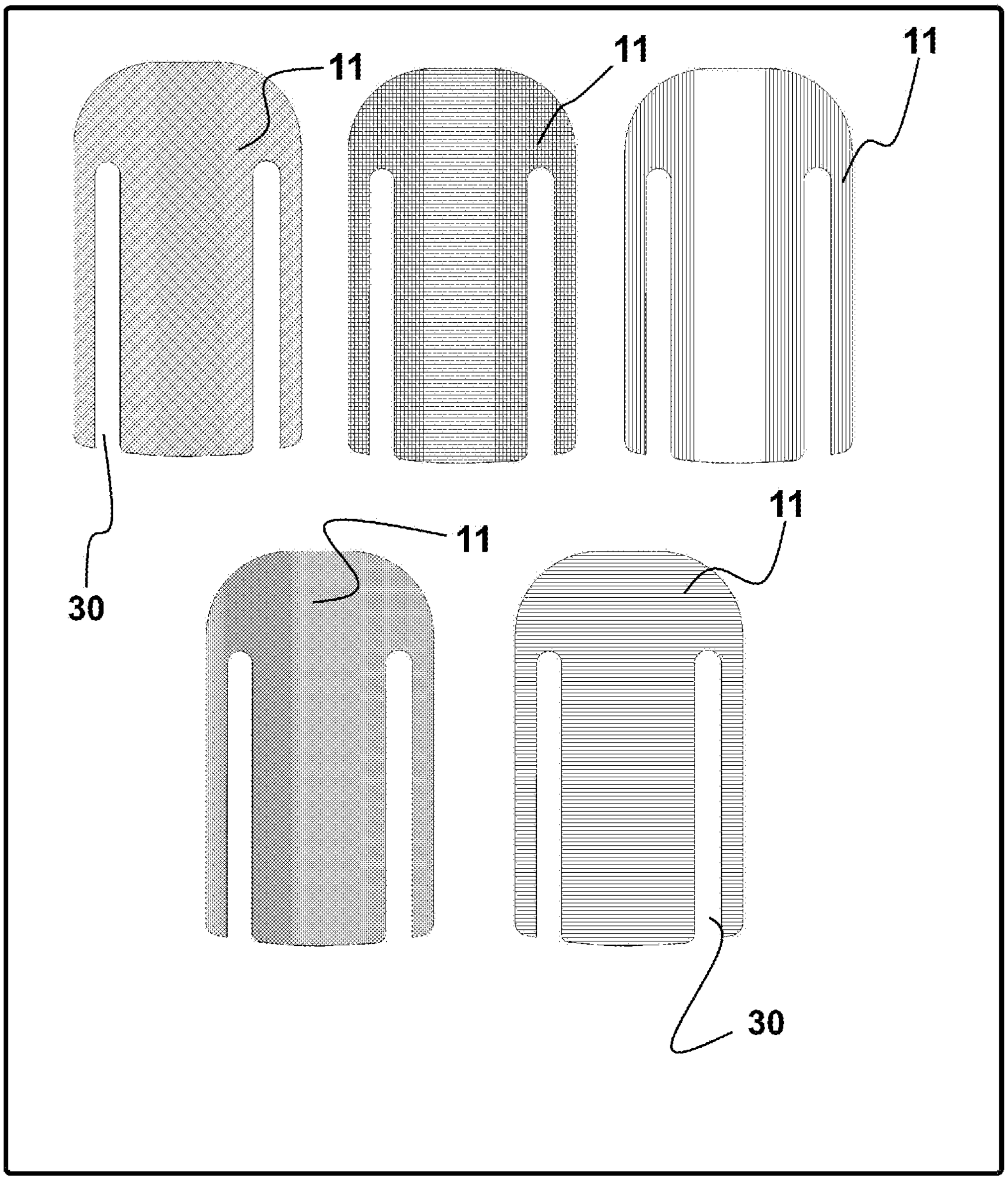
FIG. 11 shows the provision of the spacing devices in a kit thereof where the individual spacing devices have differing thicknesses and angular configurations and which may be color coded to allow for easy determination of a desired spacing device.

In FIG. 11 is depicted an example of a kit of insert devices 10 herein, which, as noted above, can be employed for both gauges to determine which in the kit to use to achieve the desired neck 16 to body 14 configurations. As noted and shown, each body 11 of the insert devices 10 can be color coded or imprinted with indicia which can be cross referenced to an electronic or written manual showing their dimensions and thereby allowing users to choose the insert device 10 having the body 11 dimensions they believe will position the neck 16 and body 14 in the configuration desired when finished. Where used as a gauging tool, the kit can be formed of more robust material such as metal, thereby allowing the user to determine the correct body 11 to use and to thereafter pick a body 11 from a kit of polymeric insert devices 10 or 3D print an body 11 forming the insert device 10 having the same exterior dimensional characteristics as the body 11 of the insert device 10 from the kit used as the gauge.

As noted above, the system herein, employing the insert device 10, can be computer and software enabled to thereby employ scanned dimensions captured from surface scanners 32. Such conventional surface scanners 32, conventionally, employ projected light beams, such as lasers or LED light, upon 3D surfaces to determine the height, width, and length characteristics thereof and to produce a digital 3D image, which is stored in electronic memory. Such a scanning, virtual assembly, and calculated retrofit body 11 of an insert device 10 therefrom may be ascertained, for example and in no way limiting, using the steps in FIG. 13.

Figure 12:
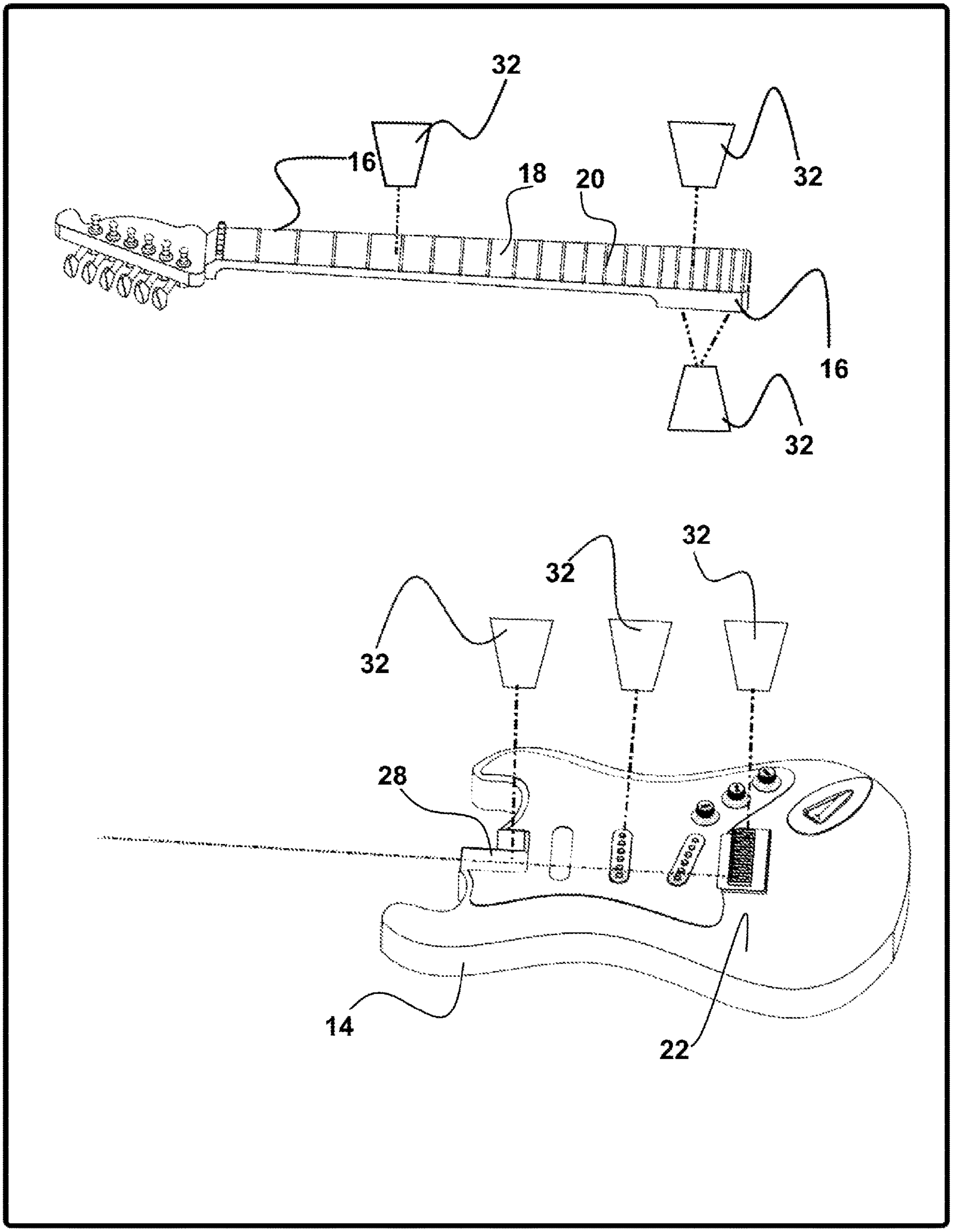
FIG. 12 depicts a mode of the system herein which would employ surface scanners, such as 3D scanners, which communicate surface vectors to a computer having software operating to the task of determining shapes, sizes, and surface angles of areas of the neck and guitar body, which can be employed to calculate a correct spacing device to achieve a desired neck and string position configuration.

An example of such surface scanning is shown in FIG. 12 which should not be considered limiting but as just an example of conventional scanning of 3D surfaces to yield 3D digital imagery of the various surfaces. The captured digital images are employed by software operating to the tasks of assembling a current image of the guitar for assessment thereof, and from the digital current configuration, calculating the correct dimensions for an insert device 10 to reconfigure the guitar to a desired configuration. In the calculation string positioning and surface angles of the neck and overall angle of the neck to the face of the guitar, would be input for use in the calculation of the body 11 dimensions for the insert device 10 to yield such.

Figure 13:
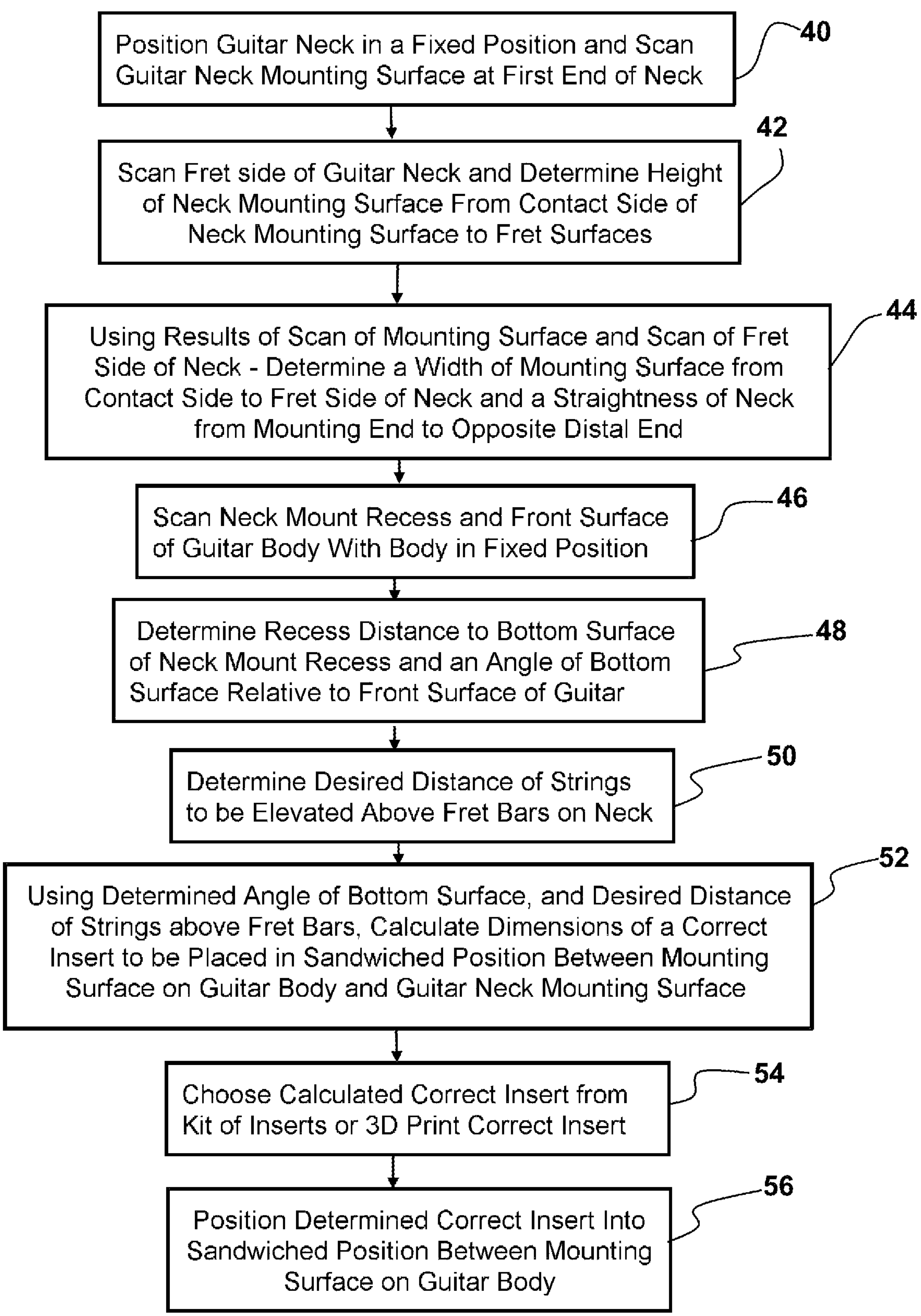
FIG. 13 is a simplified example of a method of determining a correct spacing device to achieve the desired angle of the guitar neck to the body and string positioning along the fretting or fingerboard side of the neck.

As noted, an example of one such method for using scanned imagery and software operating to employ such imagery to yield the optimal dimensional configuration of the exterior dimensions of the body 11 for an insert 10 is shown in FIG. 13. It should be noted such would work exceptionally well for guitar manufacturers in assembling finished guitars to factory specifications or special order configurations.

As shown in a first step 40, the guitar and neck are positioned to positions wherein a surface scanner can accurately scan the front and mounting end of the neck 16 as well as the neck mount recess and mounting surface 28 therein.

In a second step 42, once so positioned, multiple dimensional characteristics of the guitar neck and guitar body and connective engagements therebetween are scanned and digital imagery thereof saved to electronic memory.

If required, in a third step 44, using the digital imagery from the second step 42, a current thickness or width of the mounting end of the guitar neck and a straightness of the neck 16 between the mounting end and distal end of the neck 16 is ascertained.

In a fourth step 46 of the software enabled system, the mounting recess 24 formed into the body 14 of the guitar is scanned for three-dimensional measurements and the depth of the recess 24 into which the mounting end of the guitar neck 16 will be engaged.

In a fifth step 48, the depth of the mounting recess 24 from the guitar face 22 surface and an angle of the mounting surface 28 in the bottom of the mounting recess 24, relative to the face of the body 14 of the guitar, is determined.

In a sixth step 50, the desired distance of strings engaged between the distal end of the neck 16 and a bridge on the body 14 from the neck surface 22 is determined either from factory specifications or from input from a user of the guitar.

In a seventh step 52, using the determined dimensions and digital imagery from the first five steps and the desired characteristics of the sixth step, the optimum three dimensional size and dimensions of the body 11 of an insert device 10 herein, to yield the desired geometric characteristics in the assembled guitar, is calculated by software operating to the task.

In an eighth step 54, a body 11 for an insert device 10, having the determined optimum three dimensional size and dimensions to yield the geometric characteristics, is either 3D printed or chosen from a kit of having multiple body 11 configurations.

In a final or ninth step 56, the body 11 for the insert device 10, chosen or printed, is operatively engaged in the sandwiched position in the space 13 between the mounting end of the guitar neck 16, and the mounting surface 28 within the neck mount recess 24 of the guitar body 14.

Of course the steps noted in FIG. 13 may be rearranged or may include more or less steps as the case may be, with the ultimate outcome of the steps in the system being a determination of the dimensional characteristics of an insert that yields the desired functional and structural characteristics of the finally assembled guitar.

It should be noted that the disclosed insert device and system for guitar neck mounting as disclosed herein has other applications potentially, and one skilled in the art could discover these, especially upon a reading of this specification. The explanation of the features of this invention does not limit the claims of this application and other applications developed by those skilled in the art are intended to be included in this invention.

It is additionally noted and anticipated that although the insert device herein is shown in its most simple form and shape, various components and aspects of the device may be differently shaped or slightly modified when forming the invention herein. As such, those skilled in the art will appreciate the descriptions and depictions set forth in this disclosure or merely meant to portray examples of preferred modes of the guitar neck and body spacing device herein within the overall scope and intent of the invention, and are not to be considered limiting in any manner.

Further, while all of the fundamental characteristics and features of the device and system for guitar neck positioning have been shown and described herein, with reference to particular embodiments thereof, a latitude of modification, various changes and substitutions are intended in the foregoing disclosure as well as the claims which follow, and it will be apparent that in some instances, some features of the post engageable table invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An insert, comprising:

an insert body extending between a first end thereof and a second end thereof;

said insert body having a first side edge and having a second side edge positioned opposite said first side edge;

said insert having a top surface and a bottom surface both extending between said first end of said insert body and said second end of said insert body;

at least a first slot formed in said insert body, said first slot communicating between said top surface and said bottom surface and extending to an open end thereof at said first end of said insert body;

said insert body positionable to a mounted position in a space between a mounting surface of said guitar body and a mounting end of a guitar neck, at an attachment point of said guitar neck to said guitar body; and said first slot forming a first passage for a first connector extending from said guitar body to a first connection with said guitar neck, when said insert body is in said mounted position, whereby a positioning of said guitar neck relative to said guitar body is adjusted by an exterior dimensional configuration of said insert body located to said mounted position.

2. The insert of claim 1, additionally comprising:

a second slot formed in said insert body, said second slot communicating between said top surface and said bottom surface and extending to an open end thereof at said first end of said insert body;

said second slot running substantially parallel to said first slot; and said second slot forming a second passage for a second connector extending from said guitar body to a second connection with said guitar neck, when said insert is in said mounted position.

3. The insert of claim 2, additionally comprising:

said insert body being slidably positionable to said mounted position in said space between a guitar body by a sliding of said first end of said insert body into said space, while said guitar neck in a loosened said first connection to said first connector and in a loosened said second connection with said second connector, whereby said insert body is positionable to said mounted position without removing said neck from said guitar body.

4. The insert of claim 1, additionally comprising:

a tab portion of said insert body located at said second end thereof; and said tab portion extending from an edge of said guitar body adjacent said attachment point with said insert body in said mounted position.

5. The insert of claim 2, additionally comprising:

a tab portion of said insert body located at said second end thereof; and said tab portion extending from an edge of said guitar body adjacent said attachment point with said insert body in said mounted position.

6. The insert of claim 3, additionally comprising:

a tab portion of said insert body located at said second end thereof;

said tab portion extending from an edge of said guitar body adjacent said attachment point with said insert body in said mounted position; and said tab portion defining a gripping point on said insert body for a sliding of said insert body into and out of said mounted position.

7. The insert of claim 4, additionally comprising:

a tear line formed into said insert body along a side of said tab portion opposite said second end of said insert body; and said tab portion being removable from said insert body by a tearing thereof along said tear line.

8. The insert of claim 5, additionally comprising:

a tear line formed into said insert body along a side of said tab portion opposite said second end of said insert body; and said tab portion being removable from said insert body by a tearing thereof along said tear line.

9. The insert of claim 6, additionally comprising:

a tear line formed into said insert body along a side of said tab portion opposite said second end of said insert body; and said tab portion being removable from said insert body by a tearing thereof along said tear line.

10. The insert of claim 6, additionally comprising:

said insert body being one of a plurality of insert bodies in a kit of said insert bodies; and each of said insert bodies in said kit having a differing respective said exterior dimensional configuration thereof, whereby a user can chose a respective insert body from said kit which has an exterior dimensional configuration which forms a user desired said positioning of said guitar neck relative to said guitar body.

11. The insert of claim 7, additionally comprising:

said insert body being one of a plurality of insert bodies in a kit of said insert bodies; and each of said insert bodies in said kit having a differing respective said exterior dimensional configuration thereof, whereby a user can chose a respective insert body from said kit which has an exterior dimensional configuration which forms a user desired said positioning of said guitar neck relative to said guitar body.

12. The insert of claim 8, additionally comprising:

said insert body being one of a plurality of insert bodies in a kit of said insert bodies; and each of said insert bodies in said kit having a differing respective said exterior dimensional configuration thereof, whereby a user can chose a respective insert body from said kit which has an exterior dimensional configuration which forms a user desired said positioning of said guitar neck relative to said guitar body.

13. A method for changing the positioning of a guitar neck relative to the guitar body to which it is connected employing the insert of claim 3, comprising the steps of:

a first step of employing a surface scanner to scan a mounting end of the neck to determine a neck surface digital image thereof;

a second step of employing said surface scanner to scan a neck mount recess formed into the guitar body to determine a neck mount recess digital image;

a third step of using the neck surface digital image to determine a thickness and a width of the mounting end of the guitar neck;

a fourth step of using the neck mount recess digital image to determine a depth of the neck mount recess into which the mounting end of the guitar will be engaged;

a fifth step of using the neck mount recess digital image to determine an angle of a mounting surface in the bottom of the neck mount recess;

a sixth step of determining desired geometric characteristics in the assembled guitar formed by said neck in an engagement with said guitar body;

a seventh step calculating said exterior dimensional configuration of a said insert body to provide said desired geometric characteristics;

an eighth step of forming said insert body calculated in said seventh step; and a ninth step of locating said insert body so formed to said mounted position.

14. The method of claim 13 wherein said desired geometric characteristics include one or a combination of geometric characteristics from a group including:

a distance of said strings from said facing surface of said neck;

a neck pitch angle where the neck angle is pitched up from the recess;

a neck roll angle around the neck axis; and a string distance from the neck.

* * * * *